(12) United States Patent
Roy et al.

(10) Patent No.: US 7,146,303 B2
(45) Date of Patent: Dec. 5, 2006

(54) TECHNIQUE FOR INCORPORATING POWER INFORMATION IN REGISTER TRANSFER LOGIC DESIGN

(75) Inventors: Aninda Roy, San Jose, CA (US); Vipul Parikh, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 723 days.

(21) Appl. No.: 10/376,753

(22) Filed: Feb. 28, 2003

(65) Prior Publication Data

US 2004/0172232 A1    Sep. 2, 2004

(51) Int. Cl.
*G06F 17/50*    (2006.01)
(52) U.S. Cl. .............................. 703/18; 716/11; 716/17
(58) Field of Classification Search .................. 703/18; 716/17, 18
See application file for complete search history.

(56) References Cited

U.S. PATENT DOCUMENTS 6,467,074 B1 * 10/2002 Katsioulas et al. ........... 716/17
6,536,028 B1 *  3/2003 Katsioulas et al. ........... 716/17

OTHER PUBLICATIONS

Dey et al., S. Controller-Based Power Management for Control-Flow Intensive Designs, IEEE Transactions on Computer-Aided Design of Integrated Circuits and Systems, vol. 18, No. 10, Oct. 1999, pp. 1496-1508.*
Gupta et al., S. Power Modeling for High-Level Power Estimation, IEEE Transactions on Very Large Scale Integration (VLSI) Systems, vol. 8, No. 1, Feb. 2000, pp. 18-29.*
Koehl et al., J. IBM's 50 Million Gate ASICs, IEEE, Proceedings of the ASP-DAC 2003 Asia and South Pacific Design Automation Conference, Jan. 2003, pp. 628-634.*
Kumar et al., R. Leakage Power Estimation for Deep Submicron Circuits in an ASIC design Environment, Proceedings of the ASP-DAC 2002 7th Asia and South Pacific Design Automation Conference, Proceedings of the 15th International Conference on VLSI Design, Jan. 2002, pp. 45-50.*
Papachristou et al., C. A Multiple Clocking Scheme for Low Power RTL Design, Proceedings of the 1995 International Symposium on Low Power Design, ACM Press, Apr. 1995, pp. 1-6.*
Eiermann et al., M. Novel Modeling Techniques for RTL Power Estimation, Proceedings of the 2002 International Symposium on Low Power Electronics and Design, ACM Press, Aug. 2002, pp. 323-328.*
Ohnishi et al., M. A Method of Redundant Clocking Detection and Power Reduction at RT Level Design, Proceedings of the 1997 International Symposium on Low Power Electronics and Design, Aug. 1997, pp. 131-136.*

* cited by examiner

*Primary Examiner*—Russell Frejd
(74) *Attorney, Agent, or Firm*—Osha•Liang LLP

(57) ABSTRACT

A technique for incorporating power information in a register transfer level design involves defining a module representing an integrated circuit block having its own power grid. The integrated circuit block, when in a power off mode effectuated by a deactivation of a clock signal to the integrated circuit, uses a device dependent on a power grid of an adjoining integrated circuit block to preserve output information from the integrated circuit block to the adjoining integrated circuit block.

20 Claims, 6 Drawing Sheets

TECHNIQUE FOR INCORPORATING POWER INFORMATION IN REGISTER TRANSFER LOGIC DESIGN

BACKGROUND OF INVENTION

As shown in FIG. 1, a typical computer system 10 has, among other components, a microprocessor 12, one or more forms of memory 14, integrated circuits 16 having specific functionalities, and peripheral computer resources (not shown), e.g., monitor, keyboard, software programs, etc. These components communicate with one another via communication paths 18, e.g., wires, buses, etc., to accomplish the various tasks of the computer system 10.

Referring now to FIG. 2, in designing an integrated circuit (e.g., 16 in FIG. 1), it is first necessary to specify a desired behavior of the integrated circuit. Such a specification 20 should be sufficiently rigorous and thorough so as to define the behavior of the integrated circuit in any combination of internal and external, or output, states. This specification 20 is then characterized in a hardware description language (HDL) 22 (e.g., Verilog). The hardware description language 22 describes in a high level of abstraction the specified integrated circuit design in a technology-independent manner.

The hardware description language 22 for the integrated circuit design is then synthesized using register transfer level (RTL) design 24, which is discussed in more detail below. In the register transfer level design 24, the integrated circuit is described as a set of registers and a set of transfer functions that describe the flow of data between the registers.

The register transfer level design 24, using a circuit library 26, is then used in generating a netlist 28, or schematic of the integrated circuit. This netlist 28 is used in the design process to optimize a logic level description 30 of the integrated circuit design. The logic level optimization 30, using the circuit library 26, is used in generating another netlist 32. This netlist 32 is used in the design process to generate an actual, physical design 34 of the integrated circuit, which is then used to generate a circuit layout 36 of the specified integrated circuit design.

One important aspect of the integrated circuit design process described above with reference to FIG. 2 relates to the register transfer level design (24 in FIG. 2). A typical digital system, such as an integrated circuit (20 in FIG. 1) can be divided into data and control (e.g., finite state machine (FSM) logic) portions. The data portions collectively form a datapath and the control portion indicate to the datapath what to do and when to do it. Although the datapath has less influence on the control portion than the control portion has on the datapath, the datapath occasionally supplies values that influence a behavior of the control portion.

Register transfer level design is a means of exploiting the separation of the data and control portions in order to simplify the integrated circuit design process. Register transfer level design typically ignores the different values of the data, instead treating them as individual variables. Accordingly, register transfer level design is a hierarchical level of abstraction that is higher than gate, or logic, level design.

Register transfer level design focuses on design at the register level. Specifically, as shown in FIG. 3, register transfer level design is concerned with the transfer of variables 40, or information, among registers 42, where changes of state are dependent on clock cycles controlled by a clock signal 44. Still referring to FIG. 3, it is assumed that a clock cycle is long enough for logic 46 between the registers 42 to stabilize before a next active clock signal 44 transition.

FIG. 4 shows a typical register form 50 for a register transfer level design. In FIG. 4, the register form 50 is representative of a plurality of flip-flops 52, 54, and 56. Those skilled in the art will understand that in the typical integrated circuit design process, the arrangement and schematic of the plurality of flip-flops 52, 54, and 56 are generated using the previously designed register form 50. As shown in FIG. 4, the register form 50 is dependent on information 58 (operatively from another register) and a clock signal 60 that controls the flow and state of information through the register form 50.

SUMMARY OF INVENTION

According to one aspect of the present invention, a method for register transfer level design comprises: modeling a first portion of an integrated circuit design having a first power grid, where the first portion is arranged to receive a clock signal, where the first portion goes to a power-off mode when the clock signal to the first portion is deactivated, where the first portion comprises a device arranged to output to a second portion of the integrated circuit design having a second power grid, and where the device is dependent on the second power grid; defining a model of the first portion as having a clock power domain, where the clock power domain is dependent on whether the first portion is in the power-off mode; and defining the model as having a logic power domain, where the logic power domain is dependent on whether the first portion is in the power-off mode.

According to another aspect, a computer-readable medium having instructions recorded thereon for: modeling an integrated circuit block as a register transfer level design module; defining a clock power domain for the register transfer level design module, where the clock power domain is dependent on power consumption of the integrated circuit block related to a clock signal input to the integrated circuit block; and defining a logic power domain for the register transfer level design module, where the logic power domain is dependent on power consumption of the integrated circuit block related to at least one state device in the integrated circuit block.

According to another aspect, a computer system for generating a register transfer level design of an integrated circuit comprises a processor, a memory, and instructions residing in the memory and executable in the processor for: modeling a section of the integrated circuit as a register transfer level design module; defining a clock power domain for the register transfer level design module, where the clock power domain is dependent on power consumption of the section related to a clock signal input to the section; and defining a logic power domain for the register transfer level design module, where the logic power domain is dependent on power consumption of the section related to at least one state device in the section.

Other aspects and advantages of the invention will be apparent from the following description and the appended claims.

DETAILED DESCRIPTION

As power consumption is an important consideration in integrated circuit design, designers may design an integrated circuit that selectively switches power on and off on different sections, or blocks, of the integrated circuit. Specifications of integrated circuits are usually defined in terms of the signals going in and coming out of the different sections of the integrated circuit. However, because the practice of register transfer level design does not incorporate power consumption considerations, integrated circuit specifications must typically be verified through time-consuming device-level simulations.

Accordingly, embodiments of the present invention relate to a technique for incorporating power considerations and characteristics in register transfer level design. Embodiments of the present invention further relate to an integrated circuit modeling and design technique for improved register transfer level design.

Figure 1:
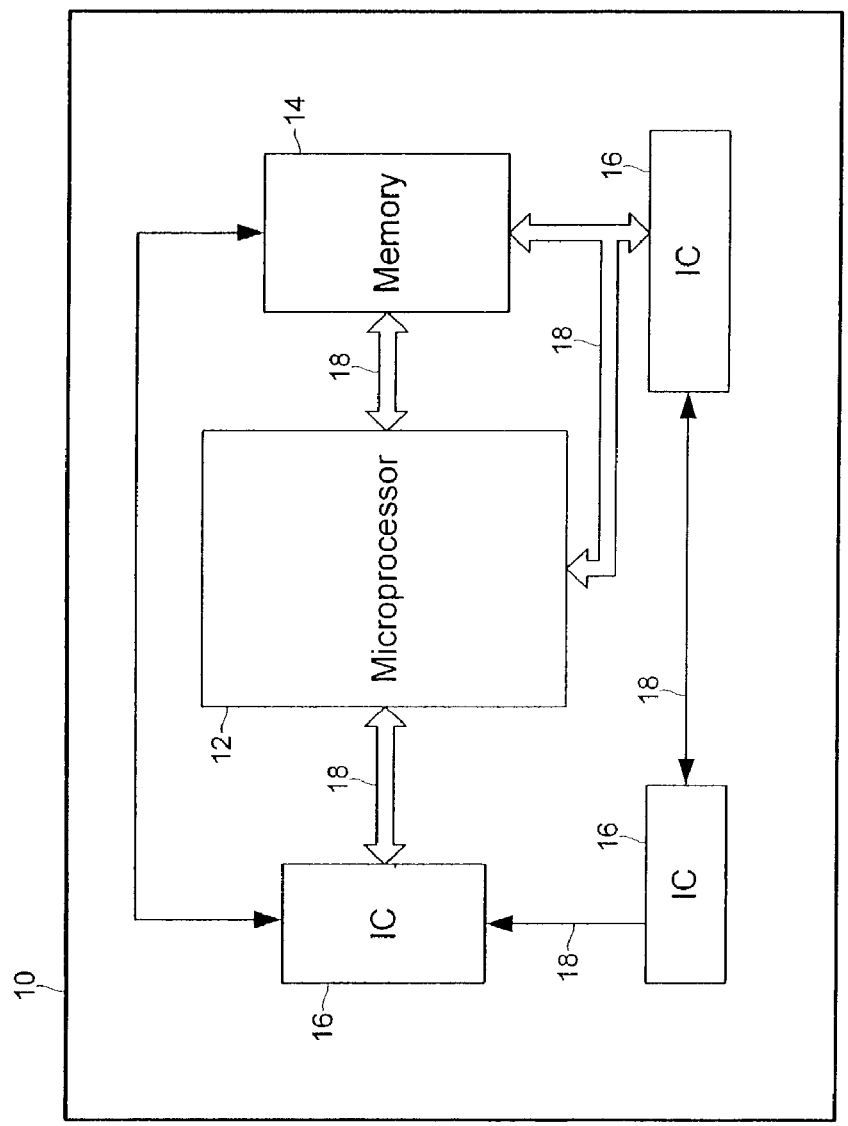
FIG. 1 shows a typical computer system.
Figure 2:
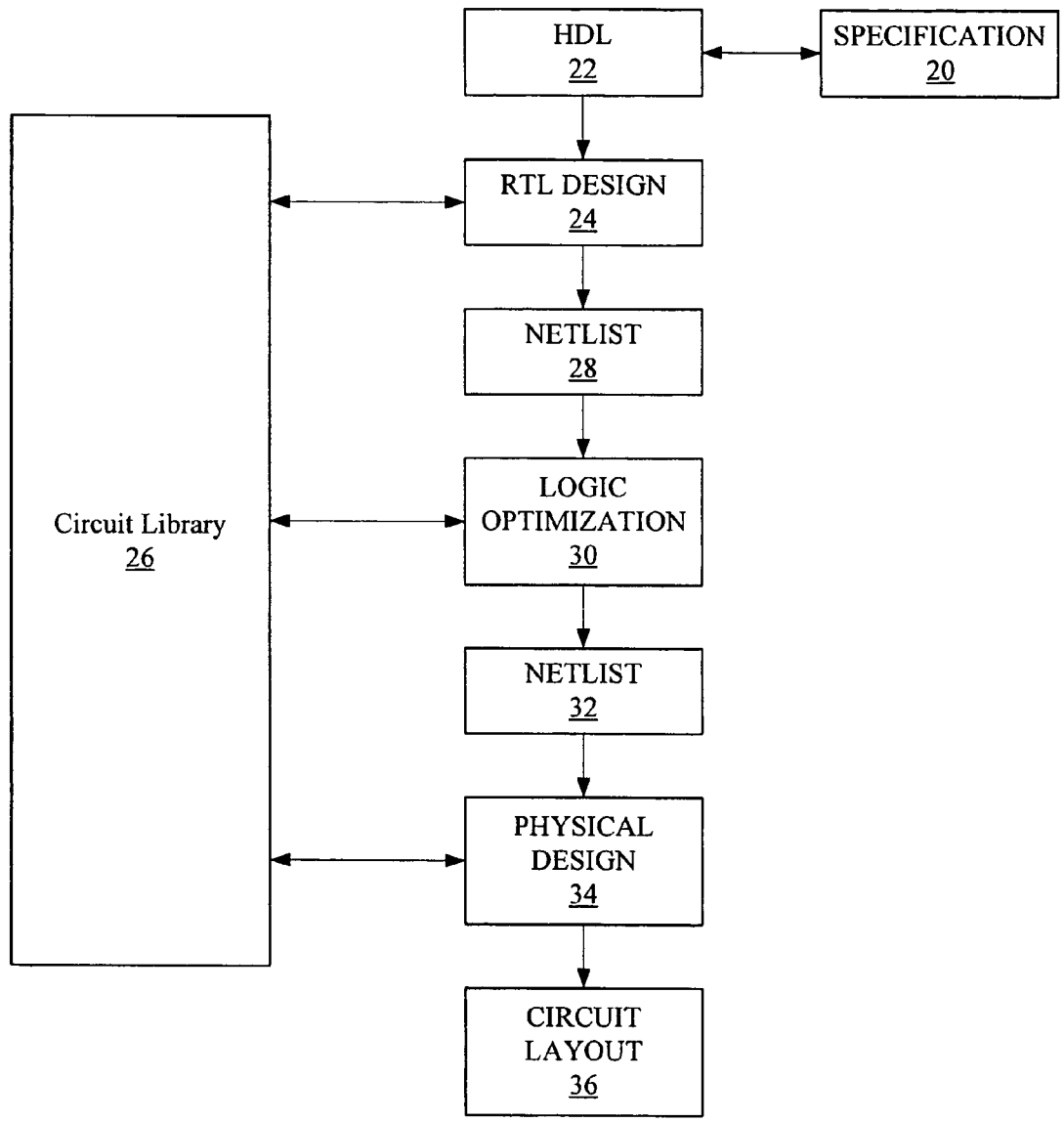
FIG. 2 shows a typical process flow for integrated circuit design.
Figure 3:
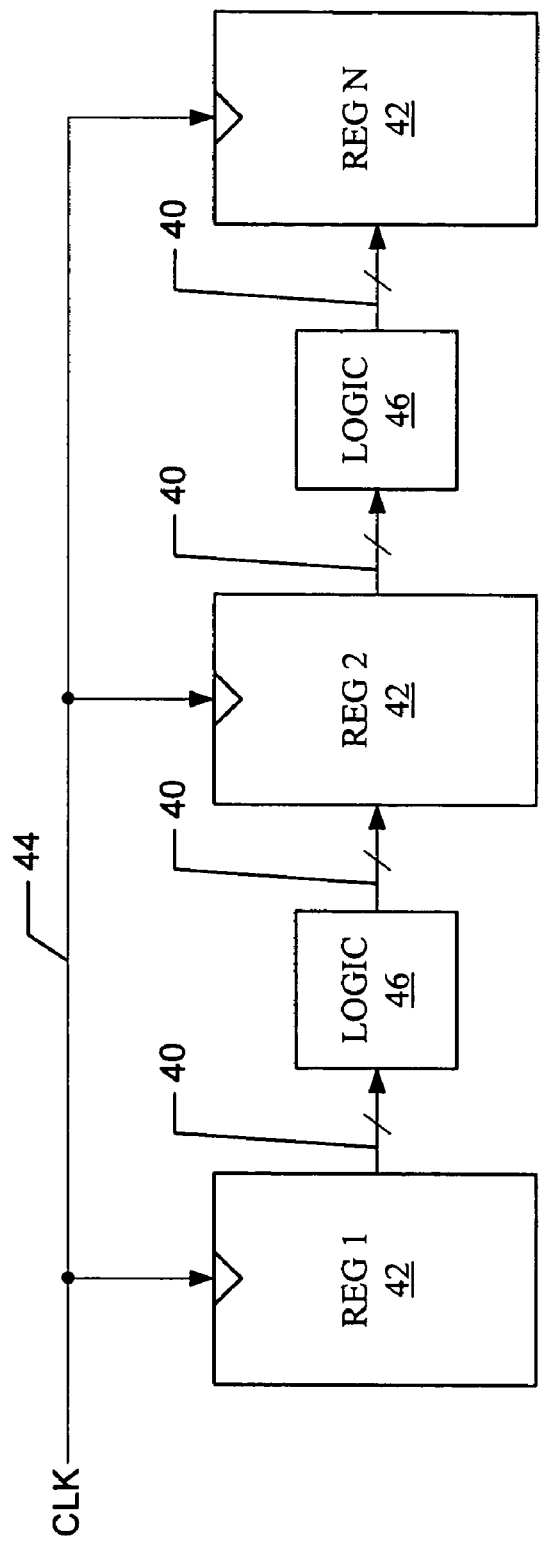
FIG. 3 shows a register transfer level block diagram of an integrated circuit.
Figure 4:
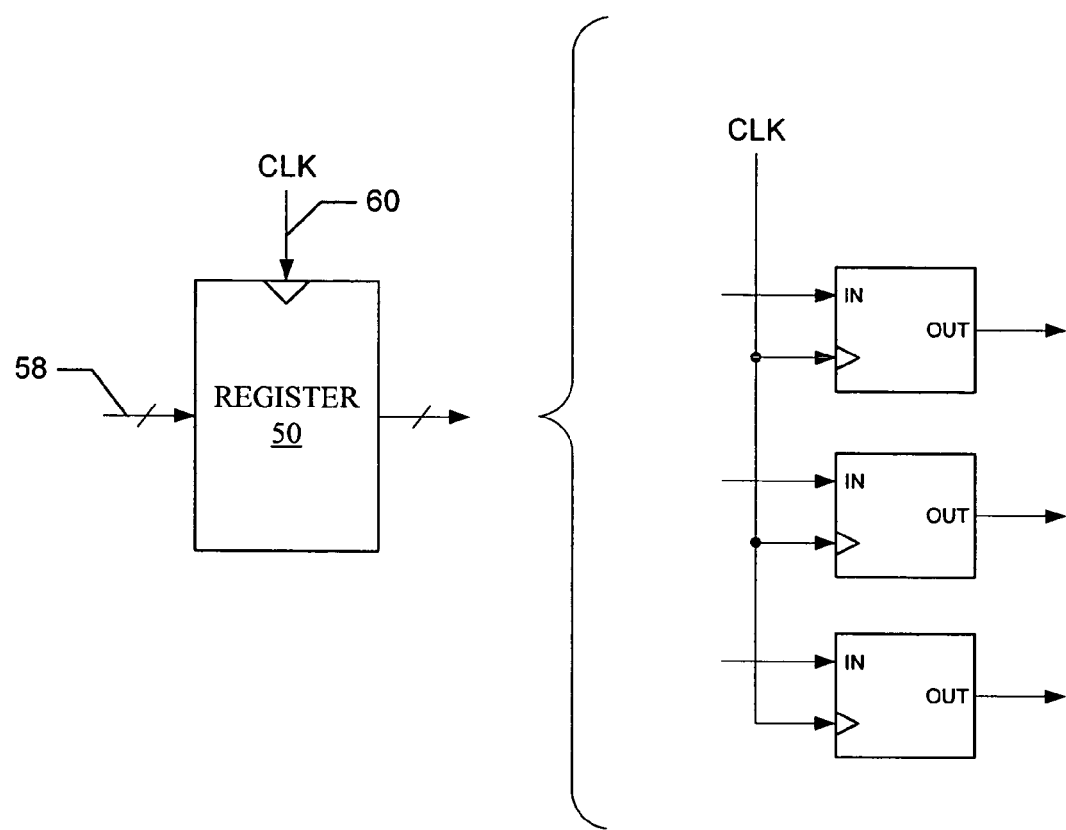
FIG. 4 shows a typical register form for a register transfer level design.
Figure 5:
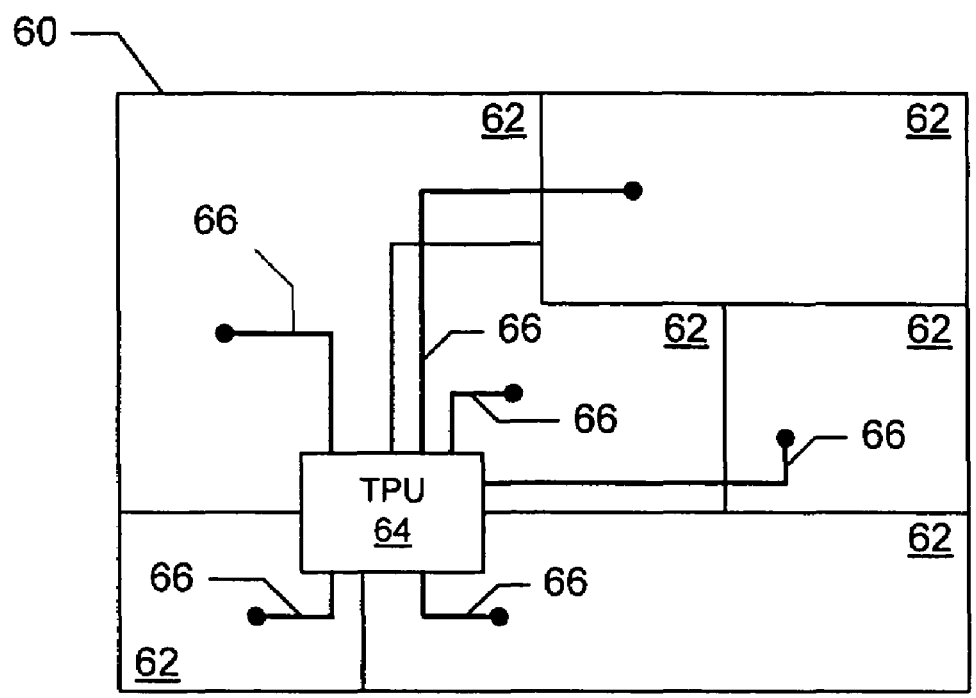
FIG. 5 shows an integrated circuit design.

FIG. 5 shows an integrated circuit 60 that is used in describing the present invention. The integrated circuit 60 is subdivided into a number of sections, or blocks 62. A test processor unit 64 provides a global clock signal 66 to the blocks 62 on the integrated circuit 60.

In a typical integrated circuit design, a total power consumption of the integrated circuit (e.g., 60 in FIG. 5) may be reduced by lowering the power consumption of a block (e.g., 62 in FIG. 5) disposed on the integrated circuit (e.g., 60 in FIG. 5). Lowering the power consumption of a selected block (e.g., 62 in FIG. 5) disposed on the integrated circuit (e.g., 60 in FIG. 5) may be effectuated by deactivating the switching of state devices (e.g., flip-flops) in the selected block. In such a case, the test processor unit (e.g., 64 in FIG. 5), which controls the clock signal (e.g., 66 in FIG. 5) to the selected block, deactivates, or switches 'off,' the clock signal (e.g., 66 in FIG. 5) to the selected block. Although a reduction in the number of state devices switching state in a particular integrated circuit block reduces power consumption, power consumption reduction is not optimal because power is still supplied to the particular integrated circuit block, resulting in leakage current flow through devices in the particular integrated circuit block.

Figure 6:
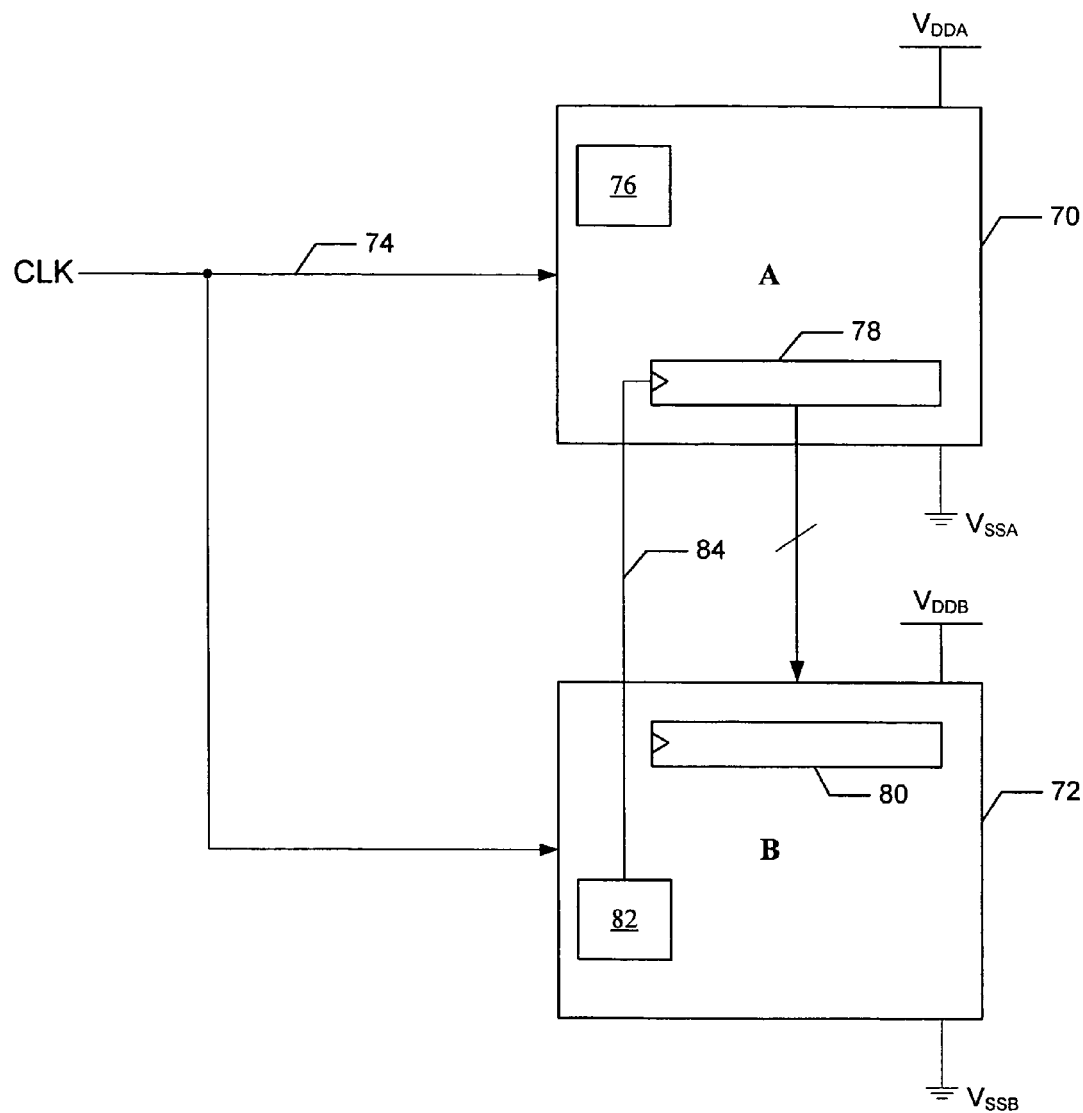
FIG. 6 shows an integrated circuit design in accordance with an embodiment of the present invention.

FIG. 6 shows an exemplary portion of an integrated circuit design in accordance with an embodiment of the present invention. In FIG. 6, two blocks 70 and 72 of an integrated circuit are shown. Each block 70 and 72 has its own power grid: power grid A represented by connections to $V_{DDA}$ and $V_{SSA}$ and power grid B represented by connections to $V_{DDB}$ and $V_{DDB}$.

In FIG. 6, when a test processor unit (e.g., 64 in FIG. 5), or other clock signal control unit, shuts off the global clock signal 74 to a particular block, for example, power grid A block 70 in FIG. 6, a control circuit 76 in the power grid A block 70 that is arranged to receive the global clock signal 74 switches power grid A off. Accordingly, control of a particular integrated circuit block's power grid is dependent on the global clock signal distributed to that particular integrated circuit block. Those skilled in the art will understand that with regard to register transfer level design, the powered off integrated circuit block may be modeled in register transfer level design as some register transfer level design module.

In order to preserve the output data of a powered off integrated circuit block to an adjoining integrated circuit block, a state device on the powered off integrated circuit block that transmits the output data is arranged to be controlled by the power grid of the adjoining, or receiving, integrated circuit block. For example, referring to FIG. 6, if the power grid A block 70 is switched off dependent on the global clock signal 74, a state device 78 in the power grid A block 70 that transmits output information and is connected to the power grid B of block 72 continues to output the output information so that the output information may be latched by a state device 80 in the power grid B block 72. Moreover, a control circuit 82 in the power grid B block 72 that is arranged to receive the global clock signal 74 controls a clock input 84 to the state device 78 in the power grid A block 70.

With regard to register level transfer design with reference to the integrated circuit design shown in FIG. 6, an integrated circuit block that is capable of having its own power grid may be modeled as a register transfer level design module. Such a register transfer level design module has power characteristics relating to a global clock signal domain and to a state device, or logic, domain in the integrated circuit block represented by the register transfer level design. The global clock signal power domain incorporates characteristics that relate to the power consumption and behavior of the integrated circuit block dependent on the global clock signal. The logic power domain incorporates characteristics that relate to the power consumption and behavior of the integrated circuit block dependent on state switching logic in the integrated circuit block.

In one or more embodiments of the present invention, each register transfer level design module has a power characteristic section that is recognizable by a register level transfer design compiler and/or simulator. The power characteristic section has explicit global signals representing a clock power domain and a logic power domain. The register transfer level design modules of library elements explicitly qualify each of their outputs for the aforementioned global power domains. In turn, the register transfer level design compiler may incorporate the power domain behavior when compiling a particular register level transfer design module. Moreover, the register transfer level design simulator, or simulation tool, may have a built-in, or inherent, function to simulate the power domain cases automatically.

Advantages of the present invention may include one or more of the following. In one or more embodiments, because register transfer level design may incorporate power characteristic information, the need for time-consuming simulations of integrated circuit specifications may be reduced.

In one or more embodiments, because an integrated circuit may be modeled so as to allow a register transfer level design to incorporate power characteristics of the integrated circuit, integrated circuit power consumption may be reduced.

In one or more embodiments, because a technique for register transfer level design of an integrated circuit explicitly incorporates power, verification of architectural specifications of the integrated circuit relating to a power-off mode of operation may be performed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of modeling an integrated circuit (IC) design comprising:
   obtaining a first block and a second block of the IC design, wherein the first block comprises:
   a global clock signal input;
   a first power grid;
   a first state device operatively connected to the first power grid;
   a second state device operatively connected to a second power grid associated with the second block, wherein the second state device is configured to transmit an output to the second block; and
   generating a model of the first block as a RTL module comprising:
   a global clock signal domain configured to perform at least one selected from the group consisting of switching on and switching off the first power grid; and
   a logic domain configured to perform at least one selected from the group consisting of activating and deactivating the first state device,
   wherein the global clock signal domain and the logic domain are associated with the global clock signal input.

2. The method of claim 1, wherein the global clock signal is controlled by a clock signal control unit.

3. The method of claim 2, wherein the clock signal control unit is at least one selected from the group consisting of a test processor unit and a central processing unit.

4. The method of claim 1, wherein the second block is connected to the global clock signal input.

5. The method of claim 1, wherein the second state device is a register.

6. The method of claim 1, further comprising:
   storing the RTL in a circuit library.

7. The method of claim 1, wherein the first block further comprises:
   a control circuit operatively connected to the first power grid and the global clock signal input.

8. The method of claim 7, wherein the control circuit is configured to deactivate the first power grid.

9. The method of claim 1, further comprising:
   compiling the RTL module.

10. The method of claim 9, further comprising:
    simulating the global clock signal power domain and the logic power domain of the compiled RTL module.

11. A computer readable medium storing instructions to model an integrated circuit design (IC), the instructions comprising functionality to:
    obtain a first block and a second block of the IC design, wherein the first block comprises:
    a global clock signal input;
    a first power grid;
    a first state device operatively connected to the first power grid;
    a second state device operatively connected to a second power grid associated with the second block, wherein the second state device is configured to transmit an output to the second block; and
    generate a model of the first block as a RTL module comprising:
    a global clock signal domain configured to perform at least one selected from the group consisting of switching on and switching off the first power grid; and
    a logic domain configured to perform at least one selected from the group consisting of activating and deactivating the first state device,
    wherein the global clock signal domain and the logic domain are associated with the global clock signal input.

12. The computer readable medium of claim 11, wherein the global clock signal is controlled by a clock signal control unit.

13. The computer readable medium of claim 12, wherein the clock signal control unit is at least one selected from the group consisting of a test processor unit and a central processing unit.

14. The computer readable medium of claim 11, wherein the second block is connected to the global clock signal input.

15. The computer readable medium of claim 11, wherein the second state device is a register.

16. The computer readable medium of claim 11, the instructions further comprising functionality to:
    store the RTL in a circuit library.

17. The computer readable medium of claim 11, wherein the first block further comprises:
    a control circuit operatively connected to the first power grid and the global clock signal input.

18. The computer readable medium of claim 17, wherein the control circuit is configured to deactivate the first power grid.

19. The computer readable medium of claim 11, the instructions further comprising functionality to:
    compile the RTL module.

20. The computer readable medium of claim 19, the instructions further comprising functionality to:
    simulate the global clock signal power domain and the logic power domain of the compiled RTL module.

* * * * *